(12) United States Patent
Huang

(10) Patent No.: US 9,354,758 B2
(45) Date of Patent: May 31, 2016

(54) MUTUAL CAPACITIVE TOUCH PANEL

(71) Applicant: Shanghai Tianma Micro-Electronics Co., Ltd., Shanghai (CN)

(72) Inventor: Zhongshou Huang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 70 days.

(21) Appl. No.: 14/347,232

(22) PCT Filed: Nov. 7, 2012

(86) PCT No.: PCT/CN2012/084199
§ 371 (c)(1),
(2) Date: Mar. 25, 2014

(87) PCT Pub. No.: WO2014/029167
PCT Pub. Date: Feb. 27, 2014

(65) Prior Publication Data
US 2014/0232690 A1 Aug. 21, 2014

(30) Foreign Application Priority Data
Aug. 23, 2012 (CN) .......................... 2012 1 0303977

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ....... G06F 3/044; G06F 3/0416; G06F 3/041; G06F 3/0418
See application file for complete search history.

(56) References Cited

U.S. PATENT DOCUMENTS

2008/0309625 A1* 12/2008 Krah et al. ..................... 345/173
2009/0009483 A1* 1/2009 Hotelling et al. ............. 345/173
(Continued)

FOREIGN PATENT DOCUMENTS

CN 102073423 A 5/2011
(Continued)

OTHER PUBLICATIONS

International Search Report and Written Opinion as issued in PCT/CN2012/084199 by the International Bureau of WIPO on Feb. 27, 2014.
Search Report as issued in corresponding European Application No. 12883208.6, dated Aug. 17, 2015.

*Primary Examiner* — Saiful A Siddiqui
(74) *Attorney, Agent, or Firm* — Alston & Bird LLP

(57) ABSTRACT

The present invention provides a mutual capacitive touch panel, including: a plurality of driving lines; a plurality of sensing lines intersecting with the plurality of driving lines; a signal output unit disposed at input ends of the driving lines is configured to output driving signals with different frequencies to all the driving lines; a preamplifier disposed at output ends of the sensing lines is configured to capture sensing signals from the sensing lines, and amplify and then output the sensing signals to a signal separation unit; the signal separation unit connected to the preamplifier is configured to separate the sensing signals with different frequencies and obtain addresses of the driving lines corresponding to the sensing signals. In the present invention, driving signals with different frequencies are outputted by the signal output unit to all the driving lines, respectively.

16 Claims, 4 Drawing Sheets

(56) References Cited

U.S. PATENT DOCUMENTS

2011/0084857 A1* 4/2011 Marino et al. .................... 341/5
2011/0248955 A1 10/2011 Mo et al.
2011/0298737 A1* 12/2011 Maeda et al. ................ 345/173
2013/0176274 A1* 7/2013 Sobel et al. ................... 345/174

FOREIGN PATENT DOCUMENTS

| CN | 102236483 A | 11/2011 |
|---|---|---|
| CN | 102576272 A | 7/2012 |
| EP | 2486475 | 8/2012 |
| WO | 2011043906 A1 | 4/2011 |

\* cited by examiner

MUTUAL CAPACITIVE TOUCH PANEL

CROSS-REFERENCES TO RELATED APPLICATIONS

This application is a United States national phase application of co-pending international patent application number PCT/CN2012/084199, filed on Nov. 7, 2012, which claims priority to Chinese patent application No. 201210303977.1, filed on Aug. 23, 2012 and entitled "MUTUAL CAPACITIVE TOUCH SCREEN", the contents of which are incorporated herein by reference in their entirety.

TECHNICAL FIELD

The present invention relates to the field of touch screen technologies, in particular to a mutual capacitive touch panel.

BACKGROUND OF THE INVENTION

Depending on sensing signal detecting modes of capacitive touch panels, the capacitive touch panels include self capacitive touch panels and mutual capacitive touch panels.

As shown in FIG. 1, a mutual capacitive touch panel contains a plurality of driving lines (for example Y1 to Y4) and a plurality of sensing lines (for example X1 to X4) intersecting with the driving lines. A sub-pixel of the touch panel is surrounded by a dashed box. A capacitance caused by the overlapping portions of the driving line and the sensing line will not be influenced by an external touching object, but will cause a steady background noise or a Direct Current (DC) component inputted to a preamplifier A. However, a mutual capacitance Cm that is formed by a spatial fringe electric field generated between the non-overlapped portions of electrodes of the driving lines and the sensing lines will be influenced directly by the external touching objects.

An equivalent circuit of a typical mutual capacitive touch panel as shown in FIG. 1 works in principles as described simply as follows: driving signals with a specific frequency are inputted one by one through ends of the driving lines, and signals with the same frequency induced by the mutual capacitance Cm between the driving lines and the sensing lines are received and amplified by preamplifiers A connected to ends of the sensing lines. When the surface of the touch panel is touched by a finger of a user, parasitic capacitances are formed between the finger and the driving lines and between the finger and the sensing lines. A portion of the signals will be directly leaked to the ground through the user's body or the grounded object via the parasitic capacitance, thus the signals received by the preamplifier A are previously attenuated. Depending on the design for the touch panel, the driving frequency and the distance between the user's finger and the electrode of the touch panel, the driving signals might be coupled from the driving lines to the sensing lines through a medium such as the user's finger, thereby the signals received by the preamplifiers A are increased. In both signal induction modes, a specific position touched by the finger T can be easily found out by detecting the signal changes in the sensing lines one by one.

In the prior art, driving signals with a specific frequency are inputted one by one to the input ends of the driving lines. When a finger touches the touch panel, the mutual capacitance between the driving line and the sensing line is changed so that the amplitude of the signal of the specific frequency received from the sensing line by a detection device is varied accordingly. Each of such driving signals of a specific frequency is necessarily inputted to each of the driving lines, that is, the driving lines are scanned by specific pulse signals. According to this method in the prior art, the circuitry becomes very complicated and costly in the case of a large number of the driving lines or the high-speed detection.

BRIEF SUMMARY OF THE INVENTION

The embodiments of the present invention provide a mutual capacitive touch panel, in which all the driving lines are synchronously driven for high-speed driving, and the circuitry is simple, to reduce the cost of the entire touch panel.

Embodiments of the present invention provide a mutual capacitive touch panel, including: a plurality of driving lines; a plurality of sensing lines intersecting with the plurality of driving lines; at least one preamplifier; a signal output unit; and a signal separation unit.

In the touch panel, the signal output unit is disposed at input ends of the driving lines and is configured to simultaneously output driving signals with different frequencies to all the driving lines.

In the touch panel, the preamplifier is disposed at output ends of the sensing lines and is configured to capture sensing signals from the sensing lines, and amplify the sensing signals and output the amplified sensing signals to the signal separation unit.

In the touch panel, the signal separation unit is connected to the preamplifier and is configured to separate the sensing signals with different frequencies and obtain addresses of the driving lines corresponding to the sensing signals.

Optionally, an output end of each of the sensing lines is connected to one of the preamplifiers.

Optionally, the touch panel further includes a shift register and selection switches, where the number of the selection switches is equal to that of the sensing lines;

an output terminal of each of the preamplifiers is connected to a first end of one of the selection switches, and a second end of each of the selection switches is connected to the signal separation unit; and an output signal of the shift register is provided to a control gate of each of the selection switches.

Optionally, a positive phase input terminal of the preamplifier is connected to a bias voltage, and an inverting input terminal of the preamplifier is connected to an output end of the corresponding sensing line.

Optionally, the touch panel further includes a shift register and selection switches, where the number of the selection switches is equal to that of the sensing lines, and the preamplifier is single.

In the touch panel, an output end of each of the sensing lines is connected with one selection switch in series, an output signal of the shift register is provided to a control gate of each of the selection switches so that a sensing signal outputted by the sensing line is selected by the shift register through controlling the turning on and off of the selection switches, the sensing signals outputted front the sensing lines are inputted to the inverting input terminal of the preamplifier, and a positive phase input terminal of the preamplifier is connected to a bias voltage.

Optionally, from an end of each sensing line the sensing signal is outputted, and the end of each sensing line is connected to a first end of the selection switch by a via hole disposed on a thin film transistor substrate or a conductive gold spacer, and second ends of all the selection switches are connected to the inverting input terminal of the preamplifier.

Optionally, the signal output unit is single and is configured to output the driving signals with different frequencies to all the driving lines; or a plurality of the signal output units are present and each of the signal output units is configured to output driving signals with different frequencies to each of the corresponding driving lines.

Optionally, the signal output unit changes the frequency of the driving signal of each of the columns of the driving lines every a predetermined time interval.

Optionally, the preamplifier further includes a feedback network containing at least two feedback branches connected in parallel, where one of the feedback branches includes a resistor and the other of the feedback branches includes a resistor and a switch connected in series, and the resistance of the feedback network is changed by controlling the turning on and off of the switches.

Optionally, the preamplifier further includes a compensation network containing a compensation resistor, and the inverting input terminal of the preamplifier is connected to a compensation signal source through the compensation resistor.

Optionally, the signal separation unit is a band-pass filter, and the number of band-pass filters connected to the output terminal of the preamplifier is equal to that of the driving lines.

Optionally, the signal output unit is a signal generator.

The present invention has the following advantages as compared with the prior art.

In the mutual capacitive touch panel provided in the present invention, driving signals with different frequencies are outputted by the signal output unit to each of the driving lines respectively, instead of driving signals with a specific frequency are outputted to the input ends of the driving lines one by one in the prior art. In the case of a large number of driving lines, the driving signals with different frequencies are sent to different driving lines simultaneously by the signal output unit in the present invention. However, the driving signals are sent one by one in the prior art, which causes not only time delays but also complicated control, because the driving lines are required to be connected and conducted one by one to send the driving signals. The touch panel provided in the present invention has simple circuitry and is convenient to control.

DETAILED DESCRIPTION OF THE PREFERRED EMBODIMENTS

The embodiments of the present invention are further described in conjunction with the accompanying drawings so as to make the objects, characteristics and advantages of the present invention more apparent.

Figure 1:
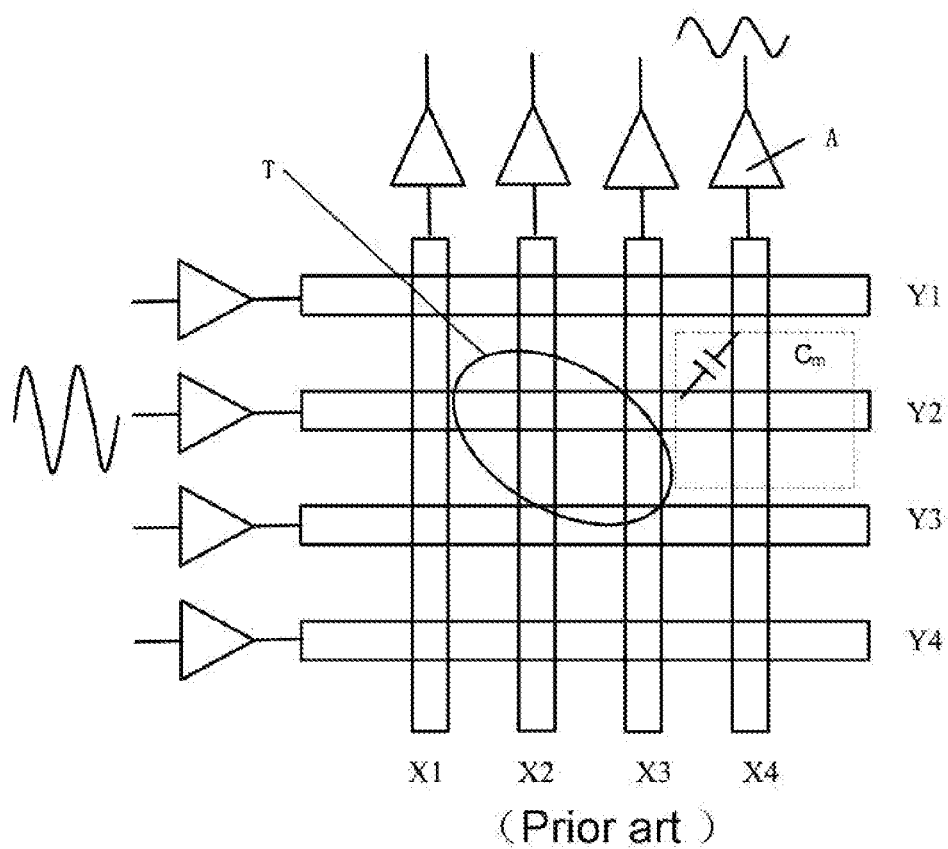
FIG. 1 is a circuit diagram showing the typical mutual capacitive touch panel in the prior art.
Figure 2:
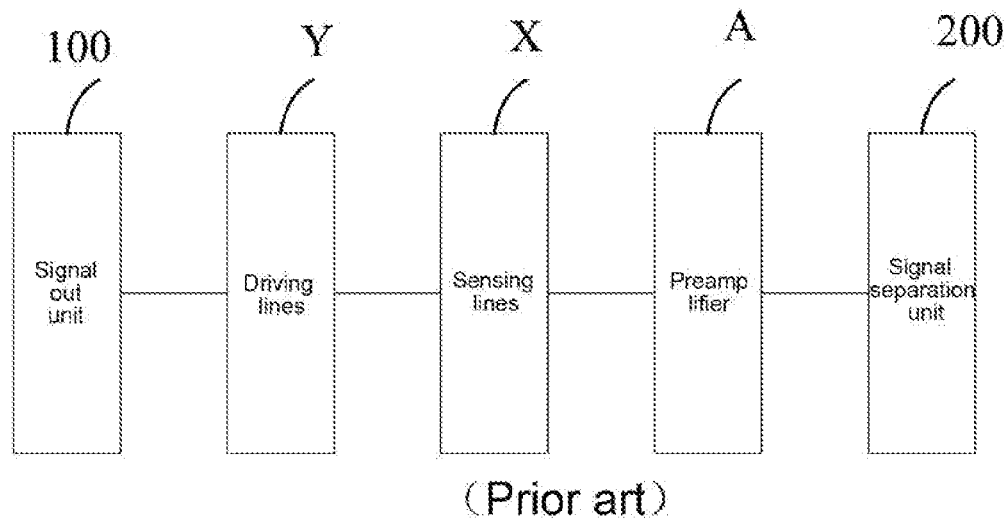
FIG. 2 is a schematic view of a mutual capacitive touch panel according to an embodiment of the present invention.

Referring to FIG. 2, which shows a schematic view of a mutual capacitive touch panel according to an embodiment of the present invention.

The mutual capacitive touch panel provided in the present embodiment includes: a plurality of driving lines Y, a plurality of sensing lines X intersecting with the driving lines, a preamplifier A, a signal output unit 100 and a signal separation unit 200.

The signal output unit 100, which is disposed at an input end of the driving lines Y, is configured to simultaneously output driving signals with different frequencies to all the driving lines Y.

The preamplifier A, which is disposed at an output end of the sensing lines X, is configured to capture sensing signals in the sensing lines X, and amplify and then output the sensing signals to the signal separation unit 200.

The signal separation unit 200, which is connected to the preamplifier A, is configured to separate the sensing signals with different frequencies and obtain addresses of the driving lines Y corresponding to the sensing signals, respectively.

In the mutual capacitive touch panel provided in the present embodiment, the driving signals with different frequencies are outputted by the signal output unit 100 to each of the driving lines Y, respectively, instead of outputting driving signals with a specific frequency to the input ends of the driving lines one by one in the prior art. In the case of a large number of the driving lines Y, the driving signals with different frequencies can be simultaneously sent by the signal output unit 100 to the different driving lines Y, respectively, and the sensing signals are eventually separated by the signal separation unit 200 to further identify the specific positions of the sensing signals, so that the driving line that sends the driving signal inducing the sensing signals can be determined However, the driving signals are required to be sent one by one in the prior art, which causes not only time delays but also the complicated control, because the driving lines Y are required to be connected and conducted one by one to send the driving signals. The touch panel provided in the present embodiment has simple circuitry and is convenient to control. Since the frequency of the driving signal outputted to each of the driving lines is different from the frequencies of the driving signals outputted to the other of the driving lines, the driving signals in the driving lines are not interfered by each other.

It is noted that only one signal output unit 100 is provided in the embodiment of the present invention to output the driving signals with different frequencies for all the driving lines Y.

Alternatively, a plurality of the signal output units 100 may be provided in the embodiment of the present invention to output the driving signals with different frequencies to the corresponding driving lines Y. For example, a first signal output unit is configured to output driving signals to the first to the Mth driving lines, and a second signal output unit is configured to output driving signals to the (M+1)th to the Nth driving lines, wherein M and N are integers and M<N. Of course, it is also possible that each of the signal output units corresponds to each of the driving lines.

It is noted that the signal output unit 100 may be a signal generator. The driving signals with different frequencies can be generated by the signal generator with configured parameters.

Figure 3:
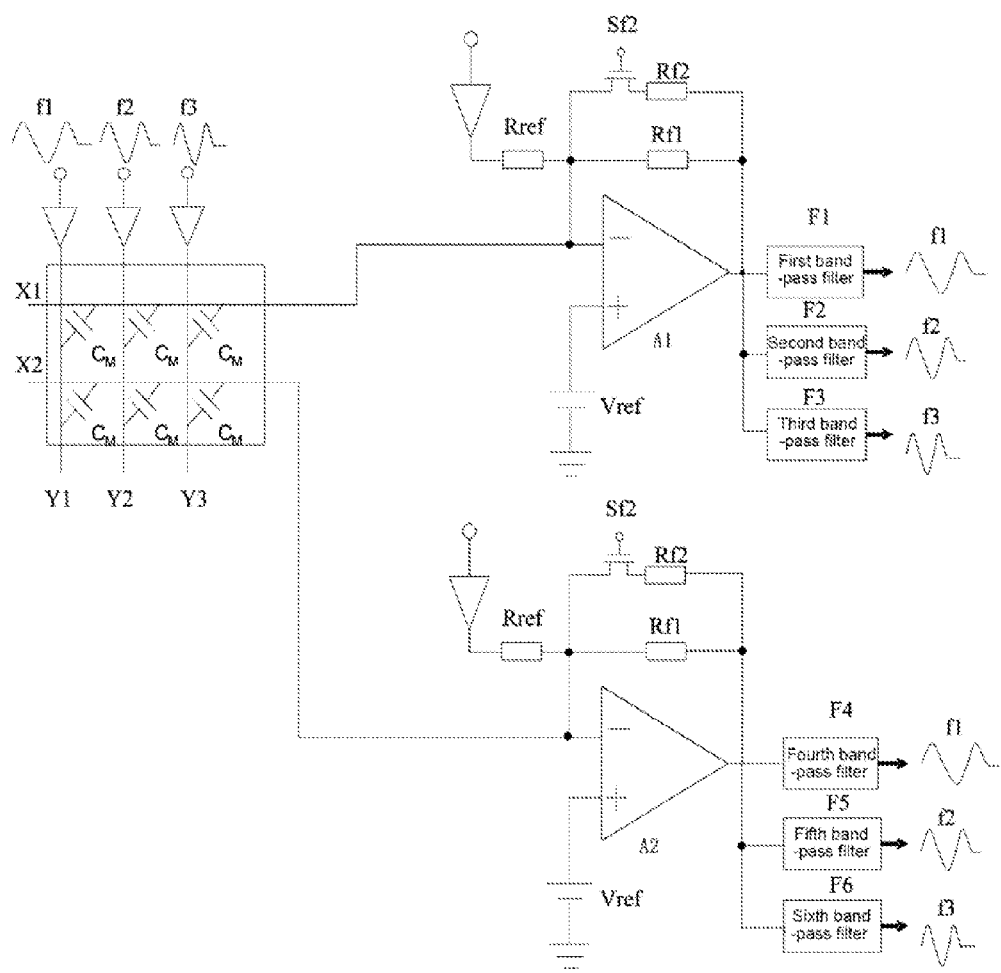
FIG. 3 is a circuit diagram of the mutual capacitive touch panel according to another embodiment of the present invention.

Reference is now made to FIG. 3, which shows a circuit diagram of the mutual capacitive touch panel according to a second embodiment of the present invention.

In the mutual capacitive touch panel provided in this embodiment, the output end of each of the sensing lines X is connected to a preamplifier A.

As shown in FIG. 3, the present embodiment is described by an example with three driving lines Y1, Y2 and Y3 and two sensing lines X1 and X2.

As can be seen from FIG. 3, the output end of each of the sensing lines is connected to a preamplifier. For example, the output end of a sensing line X1 is connected to a first preamplifier A1 and the output end of a sensing line X2 is connected to a second preamplifier A2.

It is noted that, in the present embodiment, the preamplifier further includes a feedback network, and the feedback network includes at least two feedback branches connected in parallel, where one of the feedback branches includes a resistor and the other of the feedback branches includes a resistor and a switch connected in series, and the resistance of the feedback network may be changed by controlling the on and off of the switch.

The first preamplifier A1 is taken as an example for describing below. Referring to FIG. 3, the feedback network in the first preamplifier A1 includes two feedback branches, a first feedback branch of which includes a first resistor Rf1, while a second feedback branch of which includes a second resistor Rf2 and a first switch Sf2 connected in series. When the first switch Sf2 is closed, the feedback network includes two resistors connected in parallel (i.e. the first resistor Rf1 and the second resistor Rf2); and when the first switch Sf2 is off, the feedback network includes the first resistor Rf1. That is, the resistance of the feedback network is changed by controlling the on and off of the first switch Sf2.

The preamplifier further includes a compensation network containing a compensation resistor Rref, and an inverting input terminal of the preamplifier is connected to a compensation signal source via the compensation resistor Rref.

The function of the compensation network is to compensate the output signal of the preamplifier when no signal is outputted by the sensing lines of the touch panel, so as to prevent the output terminal of the preamplifier from outputting a signal which leads to incorrect identification of the existence of a sensing signal in the touch panel.

The feedback network of the second preamplifier A2 is as same as that of the first preamplifier A1, and thus will not be described in detail herein.

In this embodiment, a positive phase input terminal of the preamplifier is connected to a bias voltage Vref and the inverting input terminal of the preamplifier is connected to the output end of the corresponding sensing line.

It is noted that the signal separation unit 200 may be a band-pass filter, through which the signals of frequencies corresponding to the driving signals are allowed to pass through, but signals of other frequencies are filtered out by the band-pass filter.

The number of the band-pass filters connected to the output end of each of the preamplifiers is equal to that of the driving lines. As shown in FIG. 3, the band-pass filters connected to the output end of the first preamplifier A1 include a first band-pass filter F1, a second band-pass filter F2 and a third band-pass filter F3. The band-pass filters connected to the output end of the second preamplifier A2, include a fourth band-pass filter F4, fifth band-pass filter F5 and a sixth band-pass filter F6.

As can be seen from FIG. 3, the output end of each of the sensing lines is connected to one preamplifier, and the circuitry structure will become very complicated in the case of a large number of sensing lines. An embodiment is further provided to decrease the complexity of the circuitry structure.

Figure 4:
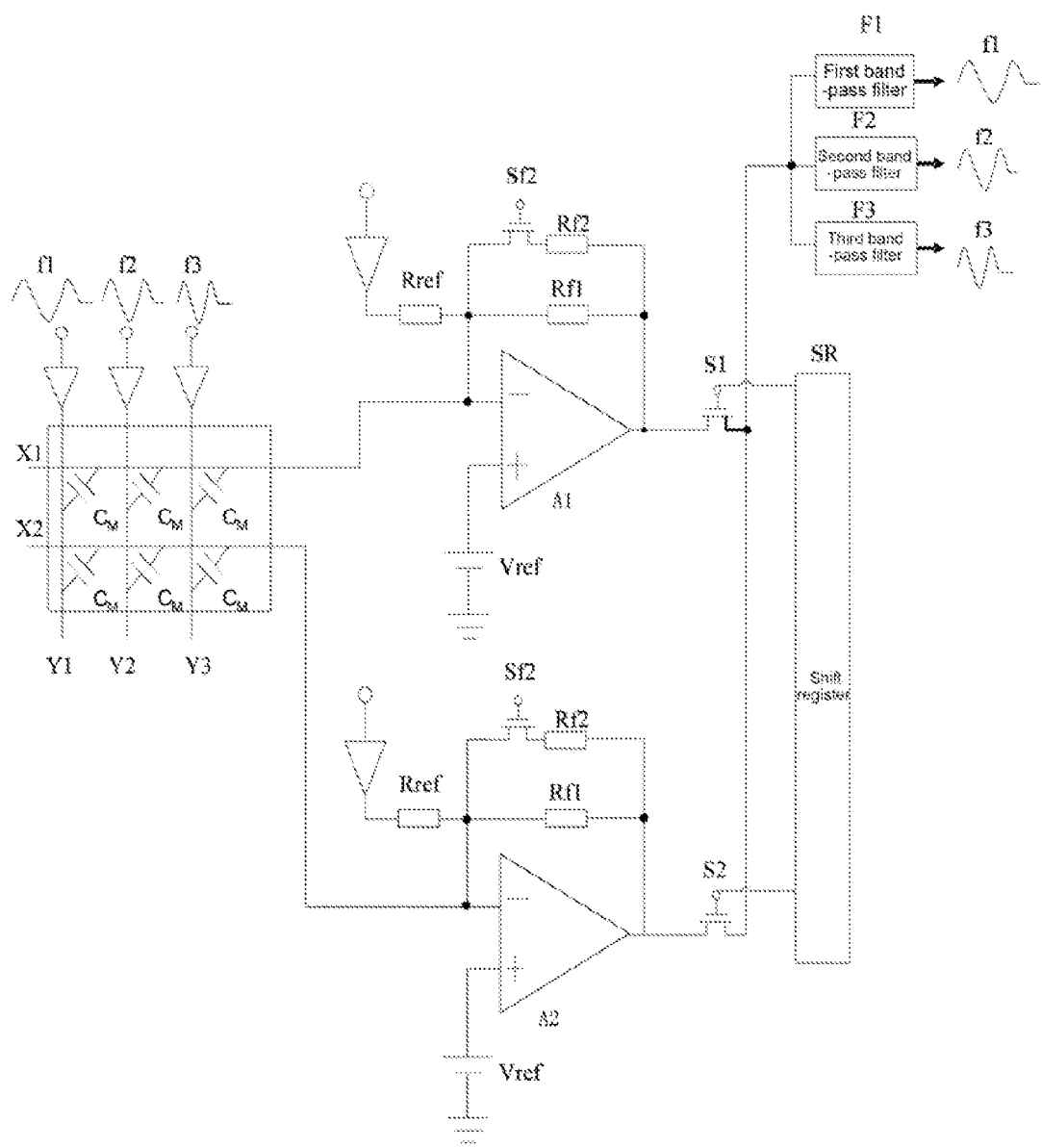
FIG. 4 is a circuit diagram of the mutual capacitive touch panel according to another embodiment of the present invention.

Reference is made below to FIG. 4, which is a circuit diagram of the mutual capacitive touch panel according to a third embodiment of the present invention.

As compared with the second embodiment, all the output terminals of preamplifiers connected to the sensing lines are connected to a shift register through selection switches in the present embodiment, thereby reducing the number of the band-pass filters, where the number of the selection switches is equal to that of the sensing lines.

As shown in FIG. 4, in the present embodiment, there are three driving lines Y1, Y2 and Y3, two sensing lines X1 and X2, first preamplifier A1 and a second preamplifier A2 that are connected to the output ends of the sensing lines, a first selection switch S1 and a second selection switch S2 respectively connected in series with output terminals of the preamplifiers, and a shift register SR.

An output signal of the shift register SR is provided to a control gate of each of the selection switches, e.g., to the control gates of both of the first selection switch S1 and the second selection switch S2 as shown in FIG. 4; and, the sensing signals from the sensing lines X1 and X2 are amplified by the corresponding preamplifier, and then the amplified sensing signals are selected by the shift register SR by controlling the turning on or off of the first selection switch S1 and the second selection switch S2. The phases of the pulse signals outputted by the shift register SR are delayed sequentially by a predetermined cycle, the selection switches are selectively turned on sequentially, thus the sensing signals from the sensing lines pass through only one set of band-pass filters F1, F2 and F3, that is, signals with different frequencies from the driving lines Y1, Y2 and Y3 are separated by the single set of band-pass filters F1, F2 and F3. Therefore, those three band-pass filters F4, F5 and F6 corresponding to the preamplifier A2 in FIG. 3 are omitted. In other words, only one set of band-pass filters are required for detecting the touch position, thereby reducing the complexity of the circuit, decreasing the control difficulty and saving the cost.

Figure 5:
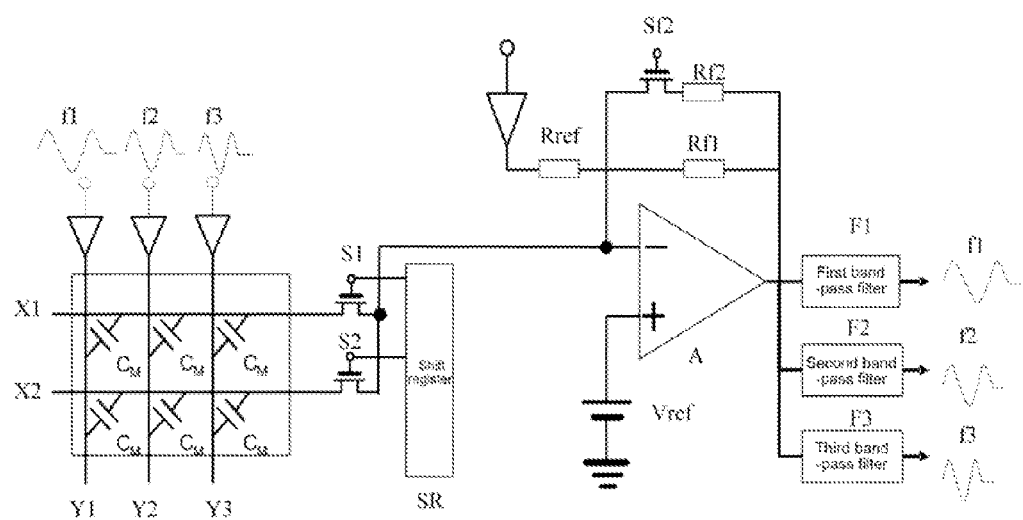
FIG. 5 is a circuit diagram of the mutual capacitive touch panel according to another embodiment of the present invention.

An embodiment of the present invention is further provided to further decrease the complexity of the circuitry structure. Reference is now made to FIG. 5, which is a circuit diagram of the mutual capacitive touch panel according to a fourth embodiment of the present invention.

A shift register SR is added to the output ends of the sensing lines in this embodiment such that the output ends of all the sensing lines are connected to the same preamplifier, and the number of band-pass filters is reduced as well.

As shown in FIG. 5, the touch panel provided in this embodiment further includes a shift register SR and selection switches, where the number of the selection switches is equal to that of the sensing lines. Two sensing lines X1 and X2 are present in the present embodiment, thus there are two selection switches corresponding to the sensing lines X1 and X2, i.e. a first selection switch S1 and a second selection switch S2, but there is only one preamplifier, i.e. the preamplifier A as shown in FIG. 5.

An output end of each of the sensing lines is connected to one selection switch in series. As shown in FIG. 5, the output end of the sensing line X1 is connected to the first selection switch S1 in series, and the output end of the sensing line X2 is connected to the second selection switch S2 in series.

An output signal of the shift register SR is provided to a control gate of each of the selection switches, e.g., to control gates of both of the first selection switch S1 and the second selection switch S2 as shown in FIG. 5. Sensing signals outputted by the sensing line X1 or X2 is selected by the shift register SR through controlling the turning on and off of the first selection switch S1 and the second selection switch S2.

The sensing signals outputted by the sensing lines X1 and X2 are inputted to the inverting input terminal of the preamplifier A, while the positive phase input terminal of the preamplifier A is connected to a bias voltage Vref.

The phases of the pulse signals outputted by the shift register SR are delayed sequentially by a predetermined cycle, so that the selection switches are sequentially turned on selectively, to output the signals from the sensing lines to the inverting input terminal of the preamplifier. Therefore, the number of the preamplifier can be decreased, that is, only one preamplifier is provided for the output ends of all the sensing lines, thereby greatly reducing the complexity of the circuit as well as the control difficulty, and saving the cost.

Similarly, since the number of the preamplifiers is decreased, the number of band-pass filters connected to the output terminal of the preamplifier is decreased accordingly.

It is noted that, in the mutual capacitive touch panel provided in this embodiment, the end of each sensing line, from which the sensing signal is outputted, is connected to a first end of the selection switch by a via hole disposed on the thin film transistor substrate or a conductive gold spacer, and the second ends of all the selection switches are connected to the input terminal of the preamplifier.

The principle of the present embodiment will be described as follows in conjunction with FIG. 5.

For example, a frequency f1 of the driving signal in a first column of driving line is 50 kHz;

a frequency f2 of the driving signal in a second column of driving line is 60 kHz; and a frequency f3 of the driving signal in a third column of driving line is 70 kHz.

After the signals are separated by the band-pass filter, it can be concluded that a specific position on the second column of the driving line Y2 is touched if the amplitude of a signal with a frequency of 60 kHz is changed.

If the signal of the sensing line is from the second selection switch S2, it can be concluded that the second row of the sensing line X2 is touched. Therefore, it is determined that coordinates of the specific position touched by the user's finger is (2, 2).

In order to obtain a feature of wider frequency response, the signal output unit may change the frequency of the driving signal to each of the columns of the driving lines every predetermined time interval in the above embodiments of the present invention. However, it is required that the frequency of the driving signal added to each of the columns of the driving lines is sufficiently different front the frequency of the driving signal added to any other column of the driving line, thus the signals with different frequencies can be separated subsequently by the band-pass filter without interference and crosstalk caused by signals of other columns.

As can be seen, the embodiments described above are preferable but not intended to limit the present invention in any way. Although the present invention has been described as above in combination with the preferable embodiments, the invention is not limited to these embodiments. Various modifications and variations may be made on the technical solutions of the present invention by those skilled in the art in light of the methods and other technical contents described above without departing from the scope of the invention, or equivalent embodiments with equivalent modifications may be obtained. Thus, any simple modifications, equivalent variations and modifications made to the embodiments based on the essence of the technical solution without departing the scope of the technical solutions of the present invention are intended to fall within the scope of this invention.

What is claimed is:

1. A mutual capacitive touch panel, comprising:
a plurality of driving lines;
a plurality of sensing lines intersecting with the plurality of driving lines;
at least one preamplifier;
a signal output unit; and
a signal separation unit,
wherein,
the signal output unit is disposed at input ends of the driving lines and is configured to simultaneously output driving signals with different frequencies to all the driving lines, wherein each of driving signals has a different frequency and is output to a different one of the driving lines respectively;
the at least one preamplifier is disposed at output ends of the sensing lines and is configured to capture sensing signals from the sensing lines, and amplify the sensing signals and output the amplified sensing signals to the signal separation unit;
the signal separation unit is connected to the preamplifier and is configured to separate the sensing signals with different frequencies, and wherein
an output end of each of the sensing lines is connected to one of the preamplifiers, and the mutual capacitive touch panel further comprises a shift register and selection switches, wherein the number of the selection switches is equal to that of the sensing lines; wherein an output terminal of each of the preamplifiers is connected to a first end of one of the selection switches, and a second end of each of the selection switches is connected to the signal separation unit; and
an output signal of the shift register is provided to a control gate of each of the selection switches.

2. The mutual capacitive touch panel of claim 1, wherein:
a positive phase input terminal of the preamplifier is connected to a bias voltage; and
an inverting input terminal of the preamplifier is connected to an output end of the corresponding sensing line.

3. The mutual capacitive touch panel of claim 1, wherein, the signal output unit is single and is configured to output the driving signals with different frequencies to all the driving lines.

4. The mutual capacitive touch panel of claim 1, wherein, the signal output unit changes the frequency of the driving signal of each of the columns of the driving lines at every predetermined time interval.

5. The mutual capacitive touch panel of claim 1, wherein the preamplifier further comprises a feedback network containing at least two feedback branches connected in parallel, wherein one of the feedback branches comprises a resistor and the other of the feedback branches comprises a resistor and a switch connected in series, and the resistance of the feedback network is changed by controlling the turning on and off of the switches.

6. The mutual capacitive touch panel of claim 5, wherein the preamplifier further comprises a compensation network containing a compensation resistor, and the inverting input terminal of the preamplifier is connected to a compensation signal source through the compensation resistor.

7. The mutual capacitive touch panel of claim 1, wherein the signal separation unit is a band-pass filter, and the number of band-pass filters connected to the output terminal of the preamplifier is equal to that of the driving lines.

8. The mutual capacitive touch panel of claim 1, wherein the signal output unit is a signal generator.

9. The mutual capacitive touch panel of claim 1, wherein a plurality of the signal output units are present and each of the signal output units is configured to output driving signals with different frequencies to each of the corresponding driving lines.

10. A mutual capacitive touch panel, comprising:
a plurality of driving lines;
a plurality of sensing lines intersecting with the plurality of driving lines;
at least one preamplifier;
a signal output unit; and
a signal separation unit,
wherein,
the signal output unit is disposed at input ends of the driving lines and is configured to simultaneously output driving signals with different frequencies to all the driving lines, wherein each of driving signals has a different frequency and is output to a different one of the driving lines respectively;
the at least one preamplifier is disposed at output ends of the sensing lines and is configured to capture sensing signals from the sensing lines, and amplify the sensing signals and output the amplified sensing signals to the signal separation unit;
the signal separation unit is connected to the preamplifier and is configured to separate the sensing signals with different frequencies, and wherein the mutual capacitive touch panel further comprises a shift register and selection switches, wherein the number of the selection switches is equal to that of the sensing lines, and the preamplifier is single, an output end of each of the sensing lines is connected with one selection switch in series, an output signal of the shift register is provided to a control gate of each of the selection switches so that a sensing signal outputted by the sensing line is selected by the shift register through controlling the turning on and off of the selection switches, the sensing signals outputted from the sensing lines are inputted to the inverting input terminal of the preamplifier, and a positive phase input terminal of the preamplifier is connected to a bias voltage.

11. The mutual capacitive touch panel of claim 10, wherein, from an end of each sensing line the sensing signal is outputted, and the end of each sensing line is connected to a first end of the selection switch by a via hole disposed on a thin film transistor substrate or a conductive gold spacer, and second ends of all the selection switches are connected to the inverting input terminal of the preamplifier.

12. The mutual capacitive touch panel of claim 10, wherein, the signal output unit is single and is configured to output the driving signals with different frequencies to all the driving lines.

13. The mutual capacitive touch panel of claim 10, wherein, the signal output unit changes the frequency of the driving signal of each of the columns of the driving lines at every predetermined time interval.

14. The mutual capacitive touch panel of claim 10, wherein the preamplifier further comprises a feedback network containing at least two feedback branches connected in parallel, wherein one of the feedback branches comprises a resistor and the other of the feedback branches comprises a resistor and a switch connected in series, and the resistance of the feedback network is changed by controlling the turning on and off of the switches.

15. The mutual capacitive touch panel of claim 14, wherein the preamplifier further comprises a compensation network containing a compensation resistor, and the inverting input terminal of the preamplifier is connected to a compensation signal source through the compensation resistor.

16. The mutual capacitive touch panel of claim 10, wherein the signal separation unit is a band-pass filter, and the number of band-pass filters connected to the output terminal of the preamplifier is equal to that of the driving lines.

* * * * *